J. & F. C. HERBY.
HUB ATTACHING DEVICE.
APPLICATION FILED FEB. 5, 1916.
1,205,534.
Patented Nov. 21, 1916.
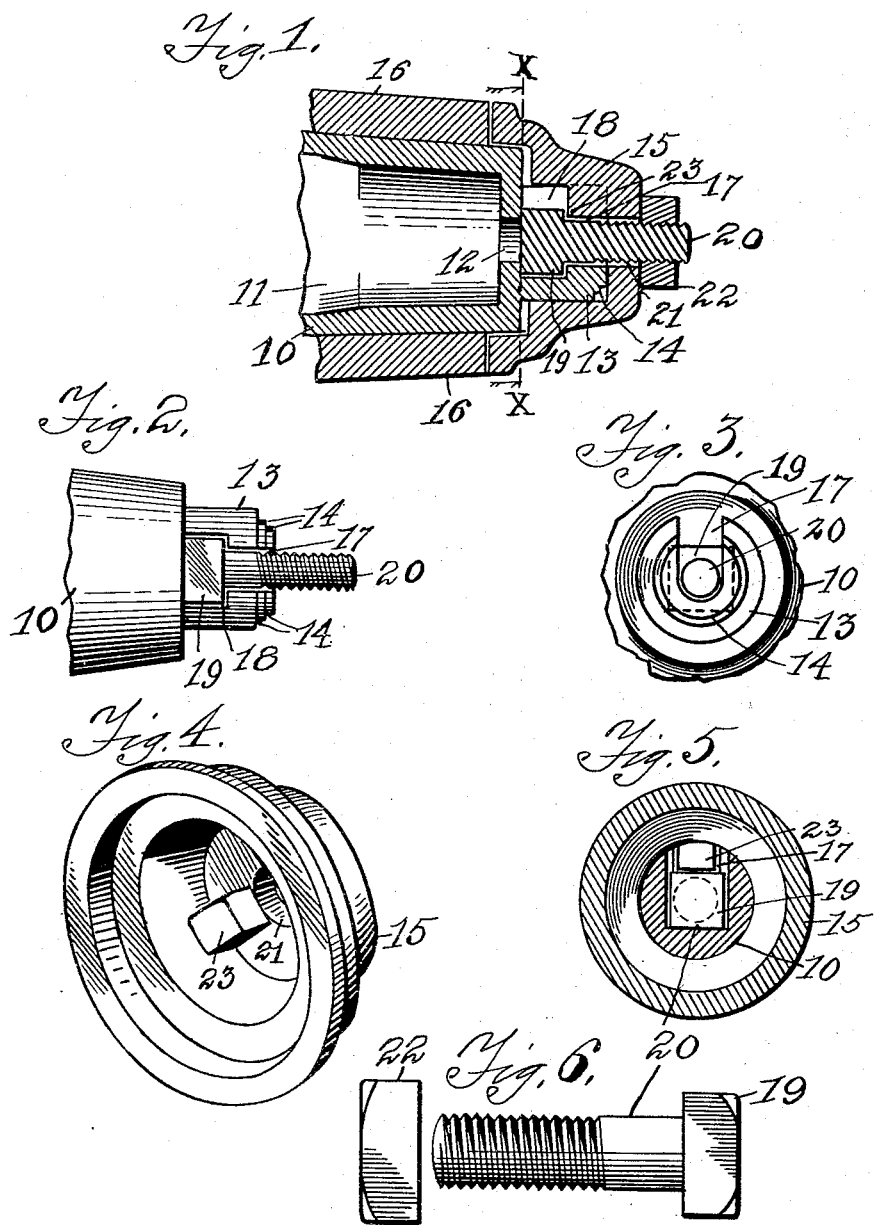

UNITED STATES PATENT OFFICE.

JOHN HERBY AND FREDERICK CHARLES HERBY, OF JAMESTOWN, NEW YORK.

HUB-ATTACHING DEVICE.

1,205,534.   Specification of Letters Patent.   Patented Nov. 21, 1916.

Application filed February 5, 1916. Serial No. 76,268.

*To all whom it may concern:*

Be it known that we, JOHN HERBY and FREDERICK CHARLES HERBY, citizens of the United States, residing at the city of Jamestown, in the county of Chautauqua and State of New York, have invented certain new and useful Improvements in Hub-Attaching Devices, of which the following, taken in connection with the accompanying drawings, is a specification.

The invention relates to improvements in the means for attaching wheel hubs upon axle skeins and the object is to provide a simple, durable and easily operated device for attaching the wheel hub on the skein which is constructed without machining or fitting, and one which is not liable to get out of order and yet which holds the wheel hub with great strength with a common machine bolt; and the invention consists in the novel features and combinations hereinafter set forth and claimed.

In the drawings, Figure 1 is a vertical lengthwise sectional view of the end of the skein and sleeve showing the attaching cap thereon and the novel arrangement of the bolt. Fig. 2 is a top plan view of the end of the wagon skein with the bolt in position in the end of the skein ready to attach the cap. Fig. 3 is an end view of the axle skein and bolt. Fig. 4 is a perspective view of the cap showing the locking lug which prevents its turning and holds the bolt in the grooved end of the skein. Fig. 5 is a sectional view at line X X in Fig. 1. Fig. 6 is an elevation of the preferred form of bolt and nut.

Like characters of reference refer to corresponding parts in the several views.

The numeral 10 designates the axle skein which is preferably a thimble-skein having the hole 11 therein and the hole 12 through the end of the skein, the outer end of the skein has the projection 13 with the stepped outer portion 14 thereon for grinding away to fit the cap 15 to the sleeve 16 of the hub as the parts wear, the projecting portions 14 being quickly and easily ground away thereby always permitting the cap 15 to fit closely upon the skein 10 and against the sleeve 16.

The projecting skein end 13 has the lengthwise groove 17 in the top thereof with the enlarged inner portion 18 to receive therein the head 19 of the common square headed bolt 20 so that said bolt 20 can be quickly and easily dropped into the groove 17, the head 19 holding firmly in said enlarged inner portion 18 of said groove 17.

A cap 15 is provided which fits against and over the projecting end 13 and the bearing portion of the skein 10 and up against the sleeve 16 of the wheel hub, the end 14 of the skein 10 being fitted to permit the firm contact of the cap 15 thereagainst. A hole 21 is provided in the center of the cap for the bolt 20 so that the nut 22 of the bolt 20 will hold the cap 15 firmly in position upon the end of the skein 10.

A lug 23 is provided on the inner side of the cap 15 which fits into the groove 17 holding firmly against the upper side of the bolt 20 so that when the cap 15 is in place said bolt 20 is held on all sides. The lug 23 also keeps the cap 15 from turning so that there is no danger of the nut 22 being turned from the bolt 20 since said square headed bolt cannot turn in the groove 17 18, and should the nut 22 be lost the common square headed bolt 20 can be obtained in any hardware store. This construction does away with all trouble from the loss of the nut or the fitting of right and left threads for the nut and skein end yet holds the attaching cap 15 strongly and firmly in position on the end of the skein 10. It is obvious that the bolts 20 and their nuts as well as the caps 15 will be interchangeable. This attachment is also accomplished without any machining or fitting, the cast skeins 10 and caps 15 being ready for use with the bolt 20. In order to provide for a take-up for the wear of the parts after long use, the stepped end 14 which can be cut away is arranged, and also the cap 15 may be made with a long flange portion 24 which extends up onto the bearing portion of the skein 10. The flange 24 may be adapted or adjusted to the length of the sleeves 16 of the hub.

We claim as new:—

1. A hub attaching device comprising a skein having an opening in the end thereof, a bolt with nut therefor, the head of said bolt received in holding engagement in said opening in the end of said skein, and a cap having a hole to receive said bolt therethrough, said nut on said bolt holding said cap against said skein.

2. A hub attaching device comprising a bolt with nut therefor, a skein with an extension on the end thereof having a lengthwise supporting groove in the upper side of said extension to receive said bolt in holding engagement with a threaded projecting end, and a cap for the end of said skein having a hole to receive said projecting end therethrough to hold said cap on said skein by said nut on said projecting end.

3. A hub attaching device comprising a skein having an opening in the end thereof, a bolt with a nut therefor, the head of said bolt received in holding engagement in said opening in the end of said skein, a cap for the end of said skein having a hole to receive said bolt therethrough, a lug on the inner side of said cap fitting into said opening in said skein to hold said bolt in said opening and prevent said cap from turning, said cap attached on said skein by said nut on said bolt on the outer side of said cap.

4. In a hub attaching device the combination with a thimble-skein of an extension on the outer end thereof, said extension having a lengthwise groove in the upper side with a square enlargement in the inner portion of said groove, a bolt received in said groove with the bolt head in said squared enlargement, a nut for said bolt, and a cap fitting over said extension of said skein to bear against the skein and having a central hole to receive the shaft of said bolt, and said nut of said bolt on the outside of said cap to hold said cap against said skein.

5. A hub attaching device comprising a square headed bolt with nut, a skein, an extension on the end of the skein having a lengthwise groove in the side thereof with a squared enlargement in the inner portion of said groove to receive and hold the square head of said bolt by means of retaining shoulders, a cap to fit over said extension and bear against the skein having a hole to receive said bolt therethrough, said nut placed in holding engagement on said bolt on the outer side of said cap, and a lug on the inner side of said cap to fit into said groove against the shaft of said bolt to hold said bolt in said groove and to hold said cap from turning.

6. A hub attaching device comprising a common machine bolt and nut, a thimble-skein, an extension on the end of the skein having a lengthwise groove in the upper side thereof with an enlarged inner portion to receive the head of said bolt and provide shoulders for retaining said head against endwise movement of said bolt, a cap having stepped recesses therein to fit over said extension and the end of the skein and against the sleeve of the hub, said cap having a hole through the center thereof to receive the shaft of said bolt, the nut of said bolt attached to said bolt shaft on the outer side of said cap to draw said bolt against the shoulders of the inner enlargement of said groove to retain said cap, and a lug on the inner side of said cap to fit into said groove to prevent said cap from turning and to hold against said bolt.

7. A hub attaching device comprising a common bolt with a nut, a thimble-skein, an extension on the end of the skein having a lengthwise groove in the upper side with an enlarged inner portion to receive said bolt in said groove with the bolt head in said enlargement, the walls of said enlargement having shoulders to prevent endwise movement of said bolt, the end of said extension of said skein having stepped projections for removal to take up the wear of the parts, a cap fitting over the end of said skein and the extension thereof to hold against the sleeve of the hub, said cap having a central hole to receive the shaft of said bolt, said nut on said bolt on the outer side of said cap to attach the same, and a lug on the inner side of said cap fitting into said groove in said extension to hold said bolt and prevent said cap from turning.

In testimony whereof we have affixed our signatures in the presence of two witnesses.

JOHN X HERBY.
his mark

FREDERICK CHARLES HERBY.

Witnesses:
HULDA A. SANDBERG,
RALPH J. CONNER.

Copies of this patent may be obtained for five cents each, by addressing the "Commissioner of Patents, Washington, D. C."